United States Patent [19]
Atallah

[11] Patent Number: 6,154,352
[45] Date of Patent: Nov. 28, 2000

[54] METHOD OF MAGNETIZING A CYLINDRICAL BODY

[75] Inventor: Kais Atallah, Sheffeld, United Kingdom

[73] Assignee: Urenco (Capenhurst) Limited, United Kingdom

[21] Appl. No.: 09/155,280

[22] PCT Filed: Mar. 27, 1997

[86] PCT No.: PCT/GB97/00895

§ 371 Date: Jan. 22, 1999

§ 102(e) Date: Jan. 22, 1999

[87] PCT Pub. No.: WO97/37362

PCT Pub. Date: Oct. 9, 1997

[30] Foreign Application Priority Data

Mar. 29, 1996 [GB] United Kingdom .................... 9606718
May 13, 1996 [GB] United Kingdom .................... 9609934

[51] Int. Cl.⁷ ...................................................... H01F 13/00
[52] U.S. Cl. ............................................................ 361/143
[58] Field of Search ...................................... 361/143–148

[56] References Cited

U.S. PATENT DOCUMENTS

| | | |
|---|---|---|
| 3,366,811 | 1/1968 | Wullkopf . |
| 5,204,569 | 4/1993 | Hino et al. . |
| 5,280,209 | 1/1994 | Leupold et al. .......................... 310/156 |
| 5,424,902 | 6/1995 | Shida et al. .............................. 361/148 |
| 5,557,248 | 9/1996 | Prochazka ................................ 361/143 |

FOREIGN PATENT DOCUMENTS

| | | |
|---|---|---|
| 35 18 851 | 11/1986 | Germany . |
| WO 94 06193 | 3/1994 | WIPO . |

*Primary Examiner*—Fritz Fleming
*Attorney, Agent, or Firm*—Adams, Schwartz & Evans, P.A.

[57] ABSTRACT

In a method of magnetizing a cylindrical body comprising a substantially isotropically distributed material according to the present invention, the method comprises the steps of: applying a magnetic field to the body; and varying the magnetic field circumferentially around the body thereby to achieve at least over a part of the cylinder a generally sinusoidal magnetization circumferentially. Thus, can advantageously be achieved a sinusoidal flux density distribution for, in particular (though without limitation), rotors for electric motors in the air gap surrounding the rotor. The resultant sinusoidal back-emf waveform is ideal for high precision servo applications. In addition, when a high pole number is adopted, such bodies can be mounted on air cored rotor-hubs, which enable a substantial reduction in inertia, without substantial loss of performance.

26 Claims, 5 Drawing Sheets

METHOD OF MAGNETIZING A CYLINDRICAL BODY

This application is a national stage application, according to Chapter II of the Patent Cooperation Treaty. This application claims the priority dates of GB 9606718.6 filed Mar. 29, 1996 and GB 9609934.6 filed May 13, 1996.

FIELD OF THE INVENTION

The present invention relates to methods of magnetising cylindrical bodies and especially, though not exclusively, to such bodies for use in rotors in electrical devices.

BACKGROUND OF THE INVENTION

It is known for instance from international patent application no. WO 94/06193 to provide a magnetic and fibre material composite cylindrical rotor. WO 94/06193 discloses a composite cylindrical rotor with helically wound tows in a plurality of layers and magnetic material in an epoxy resin in gaps between the tows.

The use of composites can provide a material of relatively high Youngs Modulus (about 120 to 350 GPa compared with about 200 GPa for steel) but with a far lower density (about 1600 kg/m$^3$ compared with 7800–8000 kg/m$^3$ for steel). Therefore, for fixed rotor dimensions the stiffness and strength to weight ratios of the composite are 3 to 9 times those of steel. This permits high speeds and faster acceleration.

It is desirable to use such a rotor in eg motors, but so far it has been difficult to achieve the necessary magnetisation distribution, in particular for applications for which multiple poles are desirable.

It is an aim of preferred embodiments of the present invention to overcome or obviate disadvantages encountered with versions of the prior art, whether referred to herein or otherwise.

SUMMARY OF THE INVENTION

According to a first aspect of the present invention, there is provided a method of magnetising a cylindrical body comprising a substantially isotropically distributed material, the method comprising the steps of:
  applying a magnetic field to the body; and
  varying the magnetic field circumferentially around the body thereby to achieve at least over a part of the cylinder a generally sinusoidal magnetisation circumferentially.

Thus, can advantageously be achieved a sinusoidal flux density distribution for, in particular (though without limitation), rotors for electric motors in the air gap surrounding the rotor. The resultant sinusoidal back-emf waveform is ideal for high precision servo applications. In addition, when a high pole number is adopted, such bodies can be mounted on air cored rotor-hubs, which enable a substantial reduction in inertia, without substantial loss of performance.

Suitably, the magnetic field varies substantially continuously circumferentially around the body.

Suitably, the step of applying a magnetic field to the body comprises the steps of:
  providing a plurality of conductor positions relative to about the body; and
  applying a current to the conductor positions thereby to generate a magnetising magnetic field.

The plurality of conductor positions enable an arrangement of magnetisation according to θm=(1+p)θ for internal fields and θm=(1−p)θ for external fields.

Suitably, the plurality of conductor positions are discrete.

Suitably, the current density omits at least one low order harmonic, desirably the 3rd order harmonic, preferably the 3rd and 5th order harmonics and more preferably the 3rd, 5th and 7th order harmonics.

Suitably, the body is magnetised such that it exhibits a generally sinusoidally varying field in the internal or external gap around the body.

It is almost impossible to generate an exact sinusoidal magnetisation distribution according to, for instance for an internal field θm=(1+p)θ and the present invention provides an advantageous approximation thereto.

The conductor positions can be located at specified angular positions to achieve the desired magnetising field distribution throughout the cylindrical body. Suitably, the angular distribution of the conductor positions is determined according to the solutions set out in equation (C) below of the following equations (A) and (B) for the cases in which there are an even and odd number of conductors per pole respectively:

$$\text{Even: } J_n = \frac{8J}{\pi n}\sin(n\alpha)\sum_{i=1}^{K}\sin(n\theta_i) \quad \text{(A)}$$

$$\text{Odd: } J_n = \frac{8J}{\pi n}\sin(n\alpha)\left(\sum_{i=1}^{K}\sin(n\theta_i) + \frac{1}{2}\sin\left(n\frac{\pi}{2}\right)\right) \quad \text{(B)}$$

solved for (C)

$$J_3 = 0$$
$$J_5 = 0$$
$$\vdots$$
$$J_{2K+1} = 0$$

in which n is the harmonic order, K is the number of conductors per half pole, $J_n$ is the current density for the nth harmonic, α is half the angle subtended by the conductor relative to the cylindrical axis and i is an integer.

Suitably, the distance d of each conductor from the body is according to the following equation (D):

$$d \geq \frac{\pi R}{pn_s} \quad \text{(D)}$$

in which R is the inner radius of the cylindrical body in the case in which the field is applied internally to the body and is the outer radius of the cylindrical body in the case in which the field is applied externally to the body, p is the number of pole-pairs and $n_s$ the order of the lowest harmonic not eliminated by the current density distribution.

In this way, harmonics above those eliminated by the angular distribution of the conductors can effectively be eliminated by minimising the magnetising effect of such higher order harmonics.

Suitably, $n_s$=7 and preferably $n_s$=9.

The number of low order harmonics that can be eliminated depends on the number of series conductors per pole/layer.

Thus, a periodic distribution can be used effectively to mimic the effects of a sinusoidally varying current density distributions.

Suitably, a slotless core can be provided adjacent the conductors. This reduces the energy required for a given magnetisation.

Suitably, the cylindrical body has a longitudinal axis, the body comprising a reinforcing layer and a magnetic layer, the magnetic layer comprising distributed magnetic material and a binder, the magnetic layer being provided in the form of at least one slab.

Suitably, the magnetic layer is thicker radially in a continuous radial thickness of the magnetic layer than a thickness of the reinforcing layer.

The arrangement of this preferred feature of the invention permits a higher magnetic loading than would be possible using prior art designs and enables higher torques because it removes fibres from the bulk of the magnetic layer.

Suitably, the at least one slab is continuous axially for a substantial part of the length of the body.

Suitably, the magnetic material is distributed substantially homogeneously throughout the magnetic layer.

Suitably, the magnetic layer comprises a plurality of separate segments.

Suitably, the body comprises at least one segment defining an arc of the body, the or each segment comprising fibre-reinforced plastics material bounding magnetic filler material, the body having a longitudinal axis, the magnetic material being arranged such that in a segment at a point along the axis and at a radius from the axis, within the segment there is magnetic material at that radius throughout the arc of the segment.

Suitably, the magnetic filler material comprises magnetic material and an adhesive. The magnetic material may comprise a powder, particles, spheroids, whiskers, fibres or the like and the adhesive preferably comprise a resin; preferably an epoxy resin. Preferably the magnetic powder material consists of neodymium-ferrous-boron.

Suitably, there are a plurality of segments.

Suitably, the percentage volume density of magnetic material in the segment is substantially more than 17%.

By providing the magnetic material in separate discrete segments supported by bounding layers, instead of forming the magnetic material as cells within a composite body as in WO 94/06193, the magnetic loading can be substantially enhanced, the body is easier to magnetise uniformly and the segments can, if desired, be magnetised separately providing far greater flexibility in the magnetic patterning of the cylindrical body.

Suitably, the substrate comprises a substrate layer on which are mounted the plurality of segments. Suitably, there is additionally provided a further layer over the plurality of segments, whereby the segments are sandwiched between the substrate and further layers.

Suitably, the substrate and/or further layers comprise a fibre-reinforced plastics material.

Suitably, the thickness of the or each segment is substantially greater than the thickness of the substrate and/or further layers. Suitably, axially only a single segment is provided.

Suitably, the body comprises a fibre reinforced plastics material bounding magnetic filler material, an outer region of said body comprising a hoop fibre layer and a helix fibre layer.

Suitably, in an inward/outward sense from the longitudinal axis of the body, the hoop layer is inside the helix layer.

Suitably, the body comprises a substrate bearing a plurality of discrete magnetic segments each segment comprising a magnetic material and an outer fibre reinforced layer about a segment, whereby circumferentially there are a plurality of segments.

Suitably the magnetic field generated by the body lies substantially within the outer circumference of the substrate.

Suitably, the magnetisation is according to the following equation in which the units are Amps per metre:

$$\theta_H = (1+p)\theta; M = |M| \cos(p\theta)\, e_r + |M| \sin(p\theta)\, e_\theta$$

for an internal field and for an external field is according to:

$$\theta_H = (1-p)\theta; M = |M| \cos(p\theta) e_r + |M| \sin(p\theta) e_\theta$$

where M is the magnetisation vector, p is the required number of pole pairs and $\theta_H$ is the angle between the magnetic field direction and the longitudinal axis of the cylindrical body.

Suitably, the magnetic field varies continuously around the circumference of the body.

According to the present invention in a second aspect there is provided a cylindrical body magnetised according to the first aspect of the present invention.

BRIEF DESCRIPTION OF THE DRAWINGS

The present invention will now be described, by way of example only, with reference to the drawings that follow, in which.

DESCRIPTION OF THE PREFERRED EMBODIMENTS

Figure 1:
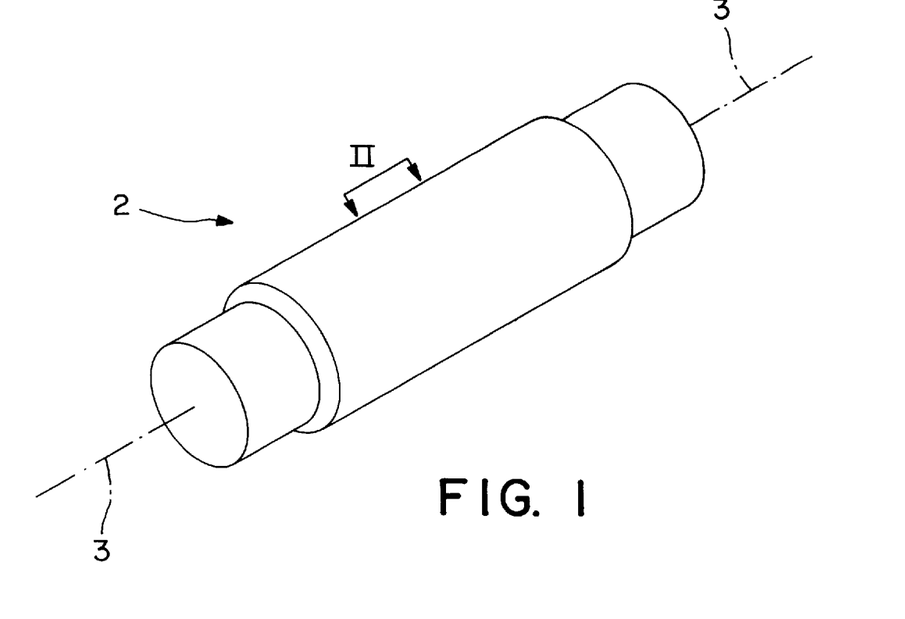
FIG. 1 is a schematic perspective illustration of a first embodiment of a cylindrical body magnetised according to the present invention.
Figure 2:
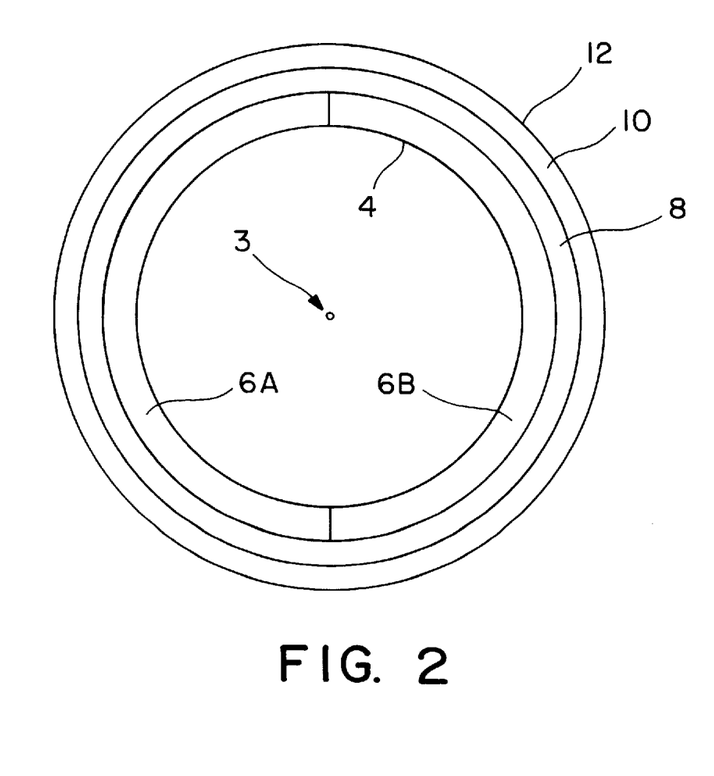
FIG. 2 is a cross section through the body of FIG. 1 on the plane II—II.

Referring to FIGS. 1 and 2 of the drawings that follow, there is shown a hollow circular cylindrical body 2 having an intended axis of rotation 3. From the axis 3 outwards, the body 2 comprises an inner substrate layer 4, two magnetic segments 6A, 6B, fibre reinforcing layers 8, 10 and an outer protective coating 12. In this context magnetic segments 6A, 6B may be regarded also as substrates. The body 2 has a length of 500 mm (of which 350 mm is the active length), an internal diameter of 100 mm and a radial thickness of about 6 mm.

The substrate 4 defines a cylindrical tube and comprises a layer of resin impregnated fibres forming a rigid substrate base layer. The substrate 4 is a single hoop layer. That is one in which the winding angle relative to the axis 3 is approximately 90°. It will be appreciated that the winding angle must not be exactly 90° otherwise the layer would be built up radially not longitudinally. It is preferred that the winding angle be chosen to lay fibre adjacent one another.

The fibres may comprise carbon fibres or alternatively may be glass fibres, Kevlar (polyaramid) plastics, boron, nylon, polyolefin or mixtures of those or any other suitable fibres. The resin can be an epoxy, in this case LY556 with HY917 hardener.

In the embodiment of FIGS. 1 and 2 two substantially similar segments 6A, 6B are shown. Each segment 6A, 6B extends for the substantial length of the cylinder defined by substrate 4. Each segment 6A, 6B is half of a cylindrical tube the internal diameter of which matches the external diameter of the substrate 4. The segments 6A, 6B each comprise a mixture of an epoxy and a magnetic material.

The magnetic material is isotropically and homogeneously distributed in a powder form, typically with a mean particle size of about 10–30 $\mu$m and may comprise iron, nickel, cobalt or an alloy containing one or more of these. It may comprise a ferrite, eg barium ferrite. Alternatively and preferably the material comprises a known hard magnetic material (ie hard to demagnetise) comprising a rare-earth element, eg cobalt-samarium or neodymium-iron-boron. The amount of magnetic material to epoxy in the segments 6A, 6B is 40–50% by volume, although up to 80% loading by volume has been achieved.

The reinforcing layer 8 comprises a fibre and epoxy hoop layer substantially similar to substrate 4.

The reinforcing layer 10 comprises a fibre and epoxy helix layer, similar to reinforcing layer 8 in materials, but wound with a winding angle relative to the rotor axis 3 of significantly less than 90°.

The hoop layer 8 provides thermal stability and radial strength. The helix layer 10 provides lateral structural stiffness. The combination of the hoop and helix layers 8, 10 provides some thermal stability and lateral stiffness, as well as a rougher surface to which protective coating 12 can key. Since, on cooling the helical layer 10 shrinks significantly more than the hoop layer 8, the latter protects the magnetic body to some extent during the cooling process.

A method of manufacturing the cylindrical body 2 of FIGS. 1 and 2 will now be described.

Figure 3:
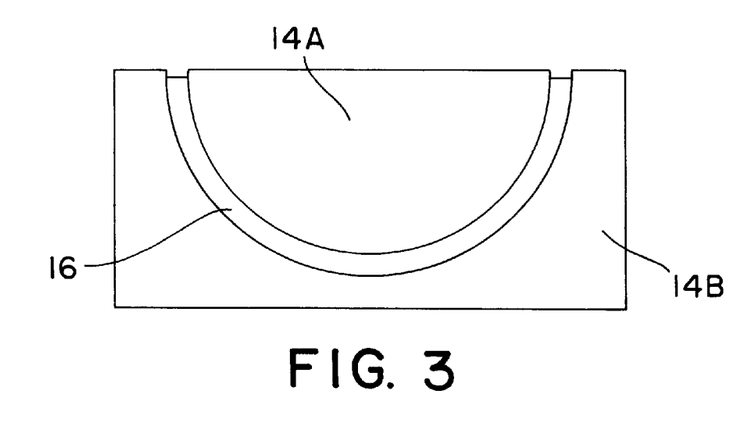
FIG. 3 is a schematic illustration of a step in the manufacturing procedure of a segment of the body of FIGS. 1 and 2.

The unmagnetised neodymium-iron-boron (NdFeB) magnetic material and uncured epoxy resin are mixed together in the ratio of up to 80% of magnetic material by volume. Referring to FIG. 3 of the drawings that follow there is shown a two part mould 14A, 14B having male 14A and female 14B components. The male mould 14A is a hemi-cylindrical body of diameter $r_1$. The female mould 14B is a cylindrical concave trough of diameter $r_2$ where $r_2$ is greater than $r_1$ by 3 mm. The NdFeB epoxy resin mixture (identified at 16) is conveyed into the female mould 14B and the male mould 14A placed centrally thereover as shown. The epoxy resin is at least partially cured. The segment 6A is then self-supporting. The segments 6A, 6B produced are of constant 3 mm thickness. This has been found to be the best compromise between inertia, magnetisation and torque for most applications.

The magnetic layers or segments 6A, 6B thereby produced are in the form of semi-cylindrical slabs comprising a generally homogeneous distribution of magnetic material and binder, without embedded fibre tows. The magnetic material is evenly distributed throughout the bulk of the segments 6A, 6B.

Next, the substrate layer 4 is formed by hoop winding carbon fibre tows impregnated with uncured epoxy resin onto a circular cylindrical mandrel (not shown) using a known fibre winding machine. Only one layer is required to form the substrate 4. Glass, Kevlar or other fibre tows could also be used.

The preformed segments 6A, 6B are then disposed about the substrate 4 and secured temporarily thereto by an epoxy glue or other fixative.

Next the hoop layer 8 of controlled thickness is wound around the segments 6A, 6B. When the fibre tows cure, a hoop layer shrinks less than a helix layer. Therefore, the hoop layer 8 protects the segments 6A, 6B which is a reason why it is desirable to have hoop layers on either side of the magnetic material. If a helically wound layer was adjacent the magnetic material, the pressure it would exert on curing could deform the segments 6A, 6B and even result in it not being possible to remove the cylindrical body from the mandrel.

The combination of hoop layer 8 and helix layer 10 each formed from fibre tows impregnated with uncured epoxy resin is wound over the magnetic material to achieve the required mechanical properties for the cylindrical body.

The resin in the substrate 4, segments 6A, 6B, layers 8 and 10 is then cured by heating the body to a curing temperature appropriate to the resin(s). The body can then be removed from the mandrel (not shown) as it will be self-supporting when cured.

A protective outer layer 12 is then disposed about the layer 10. The nature of the final layer 12 is determined by the intended application of the body 2. For instance, if the body 2 is to be used as a roller, the outer layer 10 could comprise a rubber, ceramic or stainless steel covering.

Either before or after the application of layer 12, the NdFeB is magnetised to align the particles. In fact this can be carried out at any stage. Magnetisation is achieved by passing the segments through a high strength magnetic field, typically 3 Tesla. Energies of only about 15 KJ are required because the smaller segments can be magnetised separately or the magnetisation can be achieved in stages along the length of the segment.

Figure 4:
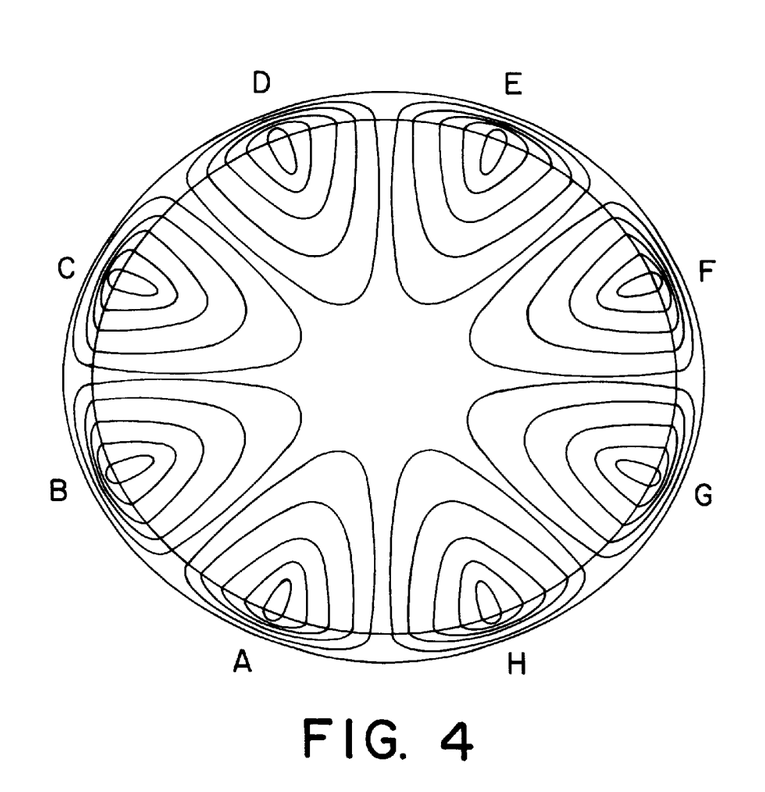
FIG. 4 is a schematic end illustration of the body of FIGS. 1 and 2 in which the magnetic fields are shown.

A preferred field pattern for the magnetised body 2 is shown in FIG. 4 of the drawings that follow magnetised by a circumferentially continuously varying field. This pattern is based on an extension of that referred to in a paper "Permanent Magnets for Production and Use of High Energy Beams", Proc. 8th Int. Workshop on Rare Earth Permanent Magnets, pp 123–136, 1985 (K Halbach) the content of which is incorporated herein by reference. The fields of FIG. 4 describe generally sinusoidal patterns.

The magnetisation field distribution H to magnetise a Halbach cylinder must satisfy the following criteria with the units being Amps per metre:

$$\frac{\partial |H|}{\partial \theta} = O, \ \theta_H = (1+p)\theta; \tag{1}$$

$$H = |H|\cos(p\theta)e_r + |H|\sin(p\theta)e_\theta$$

for an internal field, and according to the following for an external field:

$$\theta_H = (1-p)\theta; M = |M| \cos (p\theta)e_r - |M| \sin (p\theta)e_\theta$$

where p is the required number of pole-pairs H is the magnetising field strength, and $\theta_H$ is the angle between the magnetizing field direction and the reference axis.

The external field (relative to the current carrier) produced by a sinusoidally distributed current, of density $Jz = J \sin(p\theta)$, the units being Amps per square metre for an internal field relative to the cylindrical body, is given by:

$$H_r = \frac{J}{2(p+1)} \left( R_2^{(p+2)} - R_1^{(p+2)} \right) r^{-(p+1)} \cos(p\theta) \quad (2)$$

$$H_\theta = \frac{J}{2(p+1)} \left( R_2^{(p+2)} - R_1^{(p+2)} \right) r^{-(p+1)} \sin(p\theta) \quad (3)$$

in which $R_1$ is the internal radius to the current carrier and $R_2$ is the external radius to the current carrier.

Thus, the distribution of the external field satisfies the conditions for the magnetisation of a multi-pole Halbach cylinder. Externally of the cylinder, the magnetic field is kept at a minimum and normally about zero. Thus, the Halbach cylinder is substantially self-shielding.

In the Halbach paper there is reference only to the production of the field using discrete magnetic blocks orientated approximately to generate the field described above. Cylindrical bodies according to the present invention can be magnetised to produce a continuous field that better satisfies the Halbach equations (1)–(3).

In FIG. 4 the field pattern is produced from magnetising the segments 6A, 6B with a continuously varying field to produce 8 equally spaced poles (or pseudo-poles) labelled A through H for convenience. This field pattern produces a relatively high field inside the body 2, with a minimal field outside, thereby reducing electromagnetic interference caused by operation of the body 2.

The magnetisation in the body is described by the following equation (4):

$$\frac{\partial |M|}{\partial \theta} = 0; \quad \theta_M = (1+p)\theta; \quad (4)$$

$$M = |M|\cos(p\theta) e_r + |M|\sin(p\theta) e_\theta$$

where M is the magnetisation vector, p is the required number of pole pairs and $\theta_M$ is the angle between the magnetic field direction and the radial axis of reference of the body.

Figure 5:
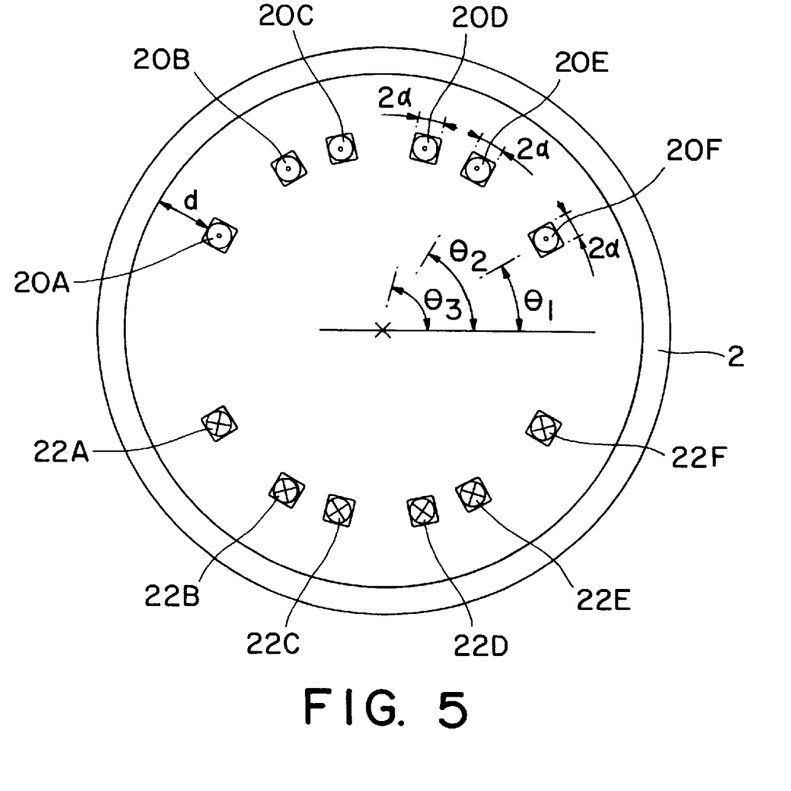
FIG. 5 is a schematic functional illustration of a magnetising arrangement according to the present invention for an internal field.

Referring to FIG. 5 of the drawings that follow, there is shown an arrangement for the internal magnetisation of the cylindrical body 2. In FIG. 5, the cylindrical body 2 has an inner radius $R_i$ and an outer radius $R_o$, and disposed internally about the body 2 are a first group of six longitudinal conductors 20A–20F and a second group of six longitudinal conductors 22A–22F. Each conductor subtends an angle of 2α. Current is passed one way through conductors 20A–20F and the other way through conductors 22A–22F in order to magnetise the cylindrical body 2.

In order that the magnetisation can so far as possible approximate the sinusoidal Halbach field desired, the angular spacing and radial distance of the conductors 20, 22 is determined as follows.

Figure 6:
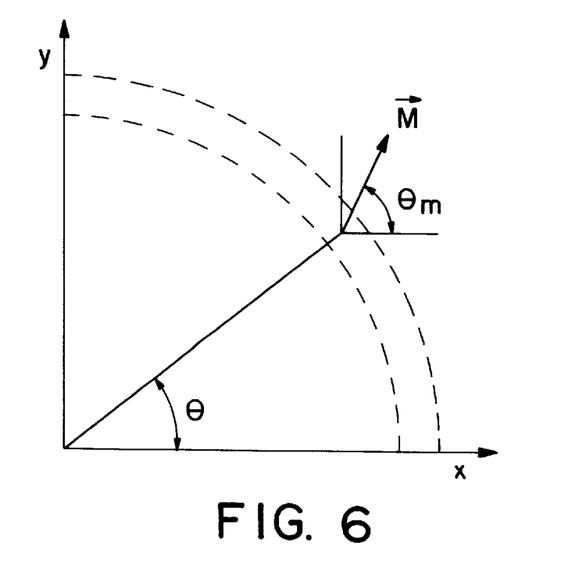
FIG. 6 is a diagram illustrating the magnetisation vector M for an internal field cylinder in a 2 pole configuration.

A multipole magnetised cylindrical body 2 with an internal field is characterised by a magnetisation distribution which satisfies:

$$\theta_m = (1+p)\theta \quad (5)$$

Where $\theta_m$ is the angle the magnetisation vector M makes with an arbitrary reference axis, as is shown in FIG. 6 of the drawings that follow, and p is the number of pole-pairs. To achieve the magnetisation distribution, the magnetising field must satisfy the same condition.

For an even number of conductors per pole, as in FIG. 4 in which there are 8, the $n^{th}$ harmonic of the current density for a distribution having K conductors per half pole is given by:

$$J_n = \frac{8J}{\pi n} \sin(n\alpha) \sum_{i=1}^{K} \sin(n\theta_i) \quad (6)$$

The number of harmonics which can be eliminated equals K. This is achieved by solving the following set of equations:

$$\begin{cases} J_3 = 0 \\ J_5 = 0 \\ \vdots \\ J_{2K+1} = 0 \end{cases} \quad (7)$$

for example, for the case in which K=3, the determination of the angles $\theta_1$, $\theta_2$ and $\theta_3$ for with the 3rd, 5th and 7th harmonics are eliminated is achieved by solving the following set of equations:

$$\{\sin(3\theta_1) + \sin(3\theta_2) + \sin(3\theta_3) = 0$$

$$\{\sin(5\theta_1) + \sin(5\theta_2) + \sin(5\theta_3) = 0$$

$$\{\sin(7\theta_1) + \sin(7\theta_2) + \sin(7\theta_3) = 0 \quad (8)$$

the solution of the set of equations (8) leads to:

$$\{\theta_1 = 33.944°$$

$$\{\theta_2 = 63.06°$$

$$\{\theta_3 = 78.328°$$

for example, another type of modulation which can be used independently or in conjunction with the previous, is one having two conductors per half pole, ie K=2. In this case, only the 3rd and 5th harmonics can be eliminated, and the angles $\theta_1$ and $\theta_2$ are determined similarly to the previous case. In this case equation (6) is reduced to:

$$\{\sin(3\theta_1) + \sin(3\theta_2) = 0$$

$$\{\sin(5\theta_1) + \sin(5\theta_2) = 0 \quad (9)$$

and the solution of equation (9) gives:

$$\{\theta_1 = 42.0°$$

$$\{\theta_2 = 78.0°$$

Alternatively, an odd number of conductors per pole can be used, ie K conductors per half pole plus one conductor situated at the centre of a pole. For these category of distributions the nth harmonic of the current density $J_n$ is given by:

$$J_n = \frac{8J}{\pi n} \sin(n\alpha) \left( \sum_{i=1}^{K} \sin(n\theta_i) + \frac{1}{2} \sin\left(n\frac{\pi}{2}\right) \right) \quad (10)$$

again the number of harmonics which can be eliminated equals K and this is achieved by determining the angular positions of the conductors solving the following set of equations:

$$\{J_3=0$$

$$\{J_5=0$$

$$\{\ldots$$

$$\{J_{2K+1}=0 \tag{11}$$

In the above equations (6) to (11) $J_n$ is the current density contributing to the magnetisation for the nth harmonic.

Regarding the distance "d" between the conductors and the magnet, this is chosen to filter the effect of the lowest harmonic not eliminated by the angular distribution of the conductors. For example in the case of the distribution the 3rd, 5th and 7th harmonics have been eliminated hence, they do not have any contribution to the magnetising field. However, the harmonics 9th, which represents the lowest harmonic not eliminated by the distribution of the conductors, and above, ie 11th etc, are still existent, and to minimise their contribution to the magnetising field in the magnet region the distance "d" is required to minimise their effect on the magnetisation. In general, the distance d is given by:

$$d = \frac{\pi R_i}{pn_s} \tag{12}$$

Where $R_i$ is the inner radius of the magnet cylinder, p the number of pole pairs and $n_s$ the order of the lowest harmonic not eliminated by the current density distribution. In the first example given above $n_s=9$. In the second example given above where only 3rd and 5th harmonics are eliminated $n_s=7$.

Although up to now the invention has been described largely in relation to internally magnetised cylindrical bodies it can equally well be applied to externally magnetised cylindrical bodies. Internal field cylindrical bodies can be used in external rotor permanent magnet motors, and external field cylindrical bodies can be used in internal rotor permanent magnet motors, as well as other applications.

Figure 7:
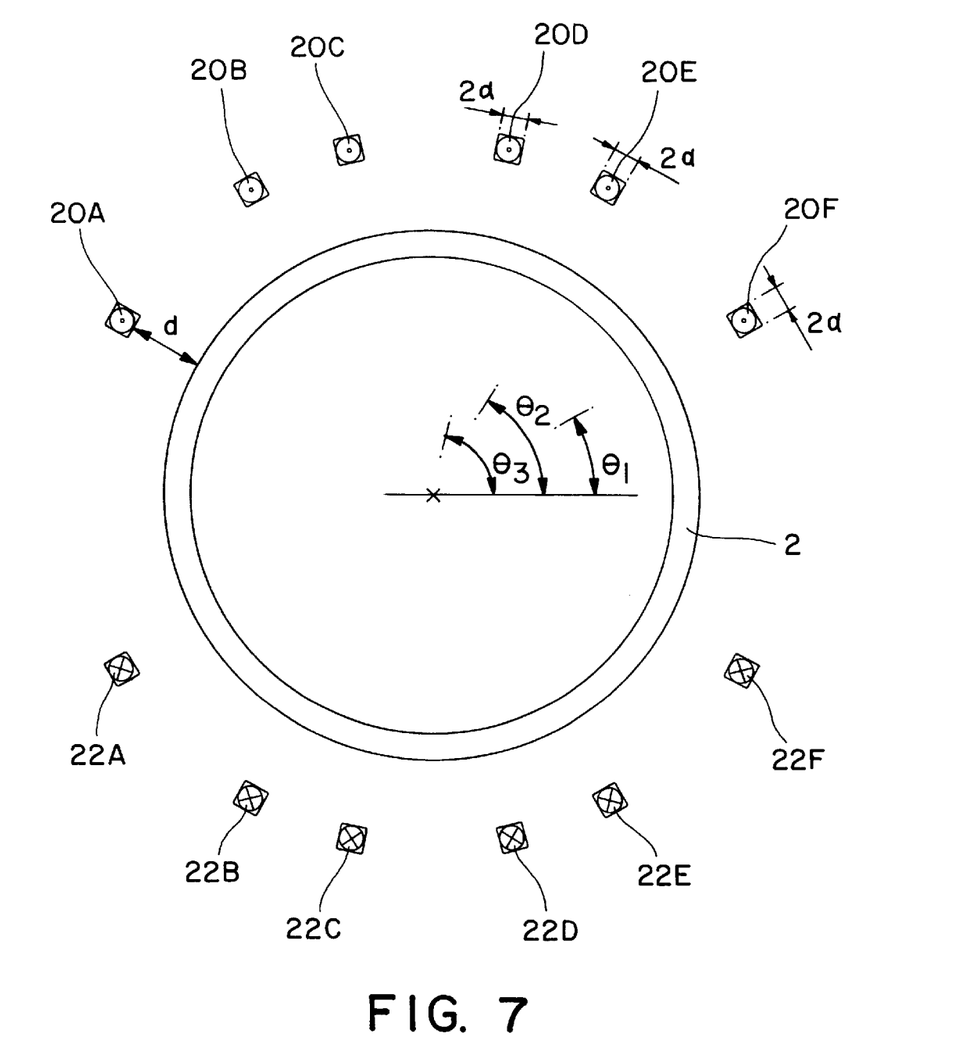
FIG. 7 is an illustration similar to FIG. 5 but for an external field cylinder.

In the case of an externally magnetised body, the conductors 20A–20F and 22A–22F are disposed about the body 2 externally as shown in FIG. 7 of the drawings that follow. For such a multiple external field cylinder the magnetisation distribution satisfies:

$$\theta_m=(1-p)\theta \tag{13}$$

and the distance "d" of a conductor from the surface of the body in order to reduce higher harmonic effects is given by:

$$d = \frac{\pi R_o}{pn_s} \tag{14}$$

where $R_o$ is the external radius of the cylinder.

Of course, the distance d can be exceeded, but this requires further energy to be imparted to the conductors to achieve the desired magnetisation.

Thus, if the cylindrical body is magnetised only internally, only an internal field is produced, and if magnetised only externally only an external field is produced. The arrangement is self-shielding.

Figure 8:
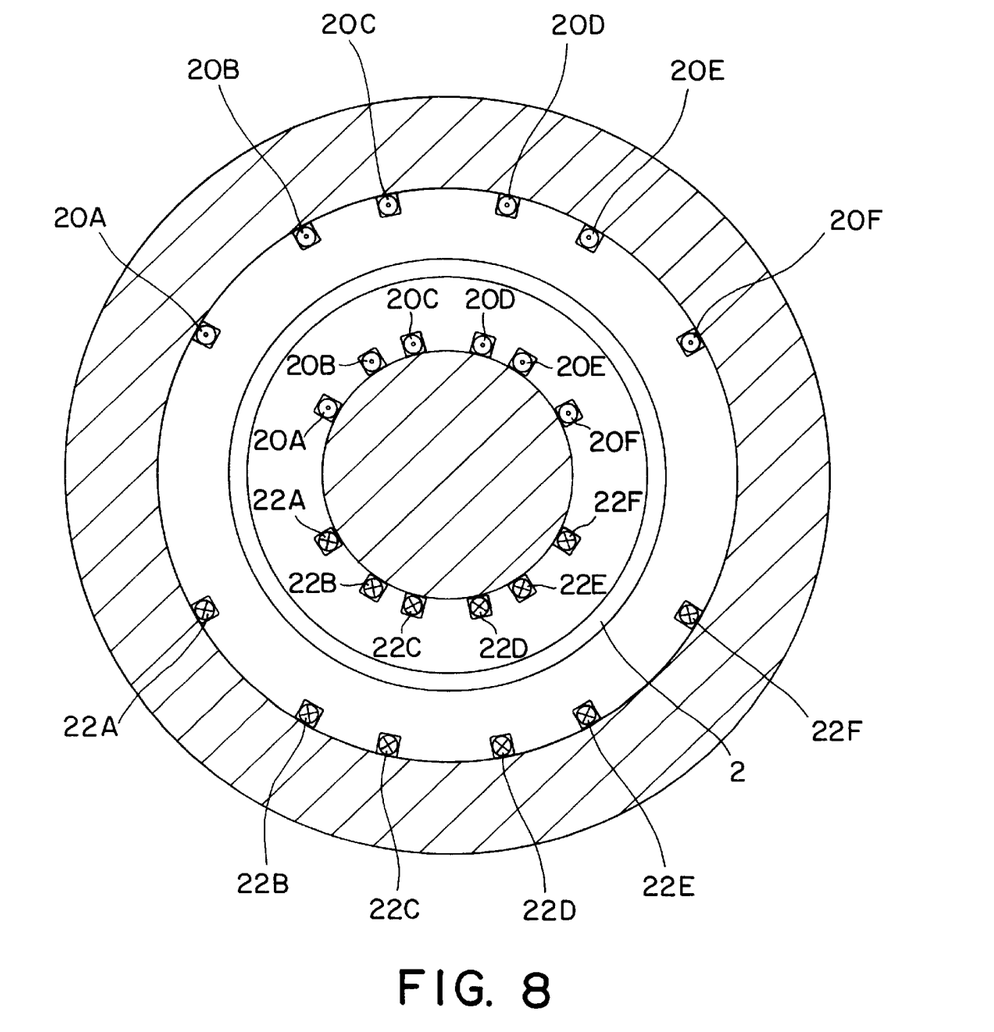
FIG. 8 is a schematic functional illustration showing internal and external magnetisation using an iron core.

In order to decrease the energy required to magnetise a given body, a slotless iron core 26 can be used as shown in FIG. 8 of the drawings that follow for both an internal and an external field. The body facing surface of the iron core should be close as close as possible to the conductors for maximum effect. It is important for the core to be slotless to make the previous equations applicable.

Magnetising fixtures are designed to imprint a specific number of poles on a cylindrical magnet. The magnetising field required for full magnetisation depends on the magnetic material to be magnetised. Three parameters are chosen to fully magnetise a multipole magnet cylinder, with a given size and using a given capacitor discharge magnetiser:

Number of series magnetising conductors per pole.

Position of the magnetising conductors.

Size of the magnetising conductors, ie cross-sectional area.

The designer can still proceed in the same way, for example choosing a specific distribution or combining different distributions in different layers to change the number of conductors per pole. However, the angular positions of the magnetising conductors and minimum distance "d" for each layer must be satisfied in any case for the preferred magnetisation.

Before use, the body 2 is tested and corrected for any imbalance using high speed rotational trials. Typically an imbalance will be corrected by removal or adding of material from or to a part of the body 2.

Magnetised cylindrical bodies of this type have many applications, such as as rotors in motors, generators or rollers. These rotors are sometimes referred to as Current Sheet Equivalent Materials.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of magnetising a cylindrical body comprising a substantially isotropically distributed material, the method comprising the steps of:

applying a magnetic field to the body; and varying the magnetic field circumferentially around the body thereby to achieve magnetisation according to the following equation:

$$\frac{\partial |M|}{\partial \theta} = 0; \quad \theta_M = (1+p)\theta; \quad M = |M|\cos(p\theta)e_r + |M|\sin(p\theta)e_\theta$$

where M is the magnetisation vector, p is the required number of pole pairs and θm is the angle between the magnetic field direction and the radial axis of reference of the body.

2. A method of magnetising a cylindrical body according to claim 1, in which the arrangement of magnetisation is according to θm=(1+p)θ for internal fields and θm=(1−p)θ for external fields.

3. A method of magnetising a cylindrical body according to claim 2, in which a plurality of conductor positions has an angular distribution determined according to the solutions set out in equation (C) below of the following equations (A) and (B) for the cases in which there are an even and odd number of conductors per pole respectively:

$$\text{Even:} \quad J_n = \frac{\theta J}{\pi n}\sin(n\alpha)\sum_{i=1}^{K}\sin(n\theta_i) \quad (A)$$

$$\text{Odd:} \quad J_n = \frac{\theta J}{\pi n}\sin(n\alpha)\left(\sum_{i=1}^{K}\sin(n\theta_i) + \frac{1}{2}\sin\left(n\frac{\pi}{2}\right)\right) \quad (B)$$

solved for (C)
$J_3 = 0$
$J_3 = 0$
$\vdots$
$J_{2k+1} = 0$ in which n is the harmonic order, K is the number of conductors per half pole, $J_n$ is the current density for the nth harmonic, α is half the angle subtended by the conductor relative to the cylindrical axis and i is an integer.

4. A method of magnetising a cylindrical body according to claim 2 or claim 3, in which the distance d of each conductor from the body is according to the following equation (D):

$$d \geq \frac{\pi R}{pn_s} \quad (D)$$

in which R is the inner radius of the cylindrical body in the case in which the field is applied internally to the body and is the outer radius of the cylindrical body in the case in which the field is applied externally to the body, p is the number of pole-pairs and $n_s$ the order of the lowest harmonic not eliminated by the current density distribution.

5. A method of magnetising a cylindrical body according to claim 4, in which $n_s=7$.

6. A method of magnetising a cylindrical body according to claim 4, in which $n_s=9$.

7. A method of magnetising a cylindrical body according to claim 2, in which a slotless core is provided adjacent the conductors.

8. A method of magnetising a cylindrical body according to claim 1, in which the cylindrical body has a longitudinal axis, the body comprising a reinforcing layer and a magnetic layer, the magnetic layer comprising distributed magnetic material and a binder, the magnetic layer, being provided in the form of at least one slab.

9. A method of magnetising a cylindrical body according to claim 8, in which the magnetic layer is thicker radially in a continuous radial thickness of the magnetic layer than a thickness of the reinforcing layer.

10. A method of magnetising a cylindrical body according to claim 8, in which the at least one slab is continuous axially for a substantial part of the length of the body.

11. A method of magnetising a cylindrical body according to claim 8, in which the magnetic material is distributed substantially homogeneously throughout the magnetic layer.

12. A method of magnetising a cylindrical body according to claim 8, in which the magnetic layer comprises a plurality of separate segments.

13. A method of magnetising a cylindrical body according to claim 8, in which the body comprises at least one segment defining an arc of the body, the or each segment comprising fibre-reinforced plastics material bounding magnetic filler material, the body having a longitudinal axis, the magnetic material being arranged such that in a segment at a point along the axis and at a radius from the axis, within the segment there is magnetic material at that radius throughout the arc of the segment.

14. A method of magnetising a cylindrical body according to claim 13, in which there are a plurality of segments.

15. A method of magnetising a cylindrical body according to claim 13, in which the percentage volume density of magnetic material in the segment is substantially more than 17%.

16. A method of magnetising a cylindrical body according to claim 8, in which the substrate comprises a substrate layer on which is mounted the plurality of segments.

17. A method of magnetising a cylindrical body according to claim 16, in which there is additionally provided a further layer over the plurality of segments, whereby the segments are sandwiched between the substrate and further layers.

18. A method of magnetising a cylindrical body according to claim 8, in which the substrate and/or further layers comprise a fibre-reinforced plastics material.

19. A method of magnetising a cylindrical body according to claim 8, in which the thickness of the or each segment is substantially greater than the thickness of the substrate and/or further layers.

20. A method of magnetising a cylindrical body according to claim 19, in which axially only a single segment is provided.

21. A method of magnetising a cylindrical body according to claim 8, in which the body comprises a fibre reinforced plastics material bounding magnetic filler material, an outer region of said body comprising a hoop fibre layer and a helix fibre layer.

22. A method of magnetising a cylindrical body according to claim 21, in which in an inward/outward sense from the longitudinal axis of the body, the hoop layer is inside the helix layer.

23. A method of magnetising a cylindrical body according to claim 8, in which the body comprises a substrate bearing a plurality of discrete magnetic segments each segment comprising a magnetic material and an outer fibre reinforced layer about a segment, whereby circumferentially there are a plurality of segments.

24. A method of magnetising a cylindrical body according to claim 1, in which the magnetic field generated by the body lies substantially within the outer circumference of the substrate.

25. A method of magnetising a cylindrical body according to claim 1, in which the magnetisation is according to the following equation in which the units are Amps per metre:

$$\theta_H=(1+p)\theta; M=|M|\cos(p\theta)e_r+|M|\sin(p\theta)e_\theta$$

for an internal field and for an external field is according to:

$$\theta_H=(1-p)\theta; M=|M|\cos(p\theta)e_r-|M|\sin(p\theta)e_\theta$$

where M is the magnetisation vector, p is the required number of pole pairs and $\theta_H$ is the angle between the magnetic field direction and the longitudinal axis of the cylindrical body.

26. A cylindrical body magnetised according to claim 1.

* * * * *